United States Patent [19]

McLaughlin

[11] Patent Number: 4,548,224

[45] Date of Patent: Oct. 22, 1985

[54] FAUCET REPAIR SYSTEM

[76] Inventor: Robert McLaughlin, 1107 Brown St., Peekskill, N.Y. 10566

[21] Appl. No.: 661,955

[22] Filed: Oct. 17, 1984

[51] Int. Cl.[4] .............................................. F16K 43/00
[52] U.S. Cl. .................................... 137/15; 134/166 C; 137/238; 137/315; 137/801; 4/191; 4/192; 4/661; 251/225; 251/264
[58] Field of Search .................. 137/15, 237, 238, 240, 137/269, 315, 801, 606; 251/215, 223, 225, 264, 273, 274; 4/191, 192, 256, 257, 661; 134/166 C

[56] References Cited

U.S. PATENT DOCUMENTS

| 667,301 | 2/1901 | Dredge | 137/238 |
|---------|--------|--------|---------|
| 831,722 | 9/1906 | Holmes | 137/240 |
| 1,563,344 | 12/1925 | Corbett | 137/237 |
| 1,763,808 | 6/1930 | Muffly | 137/269 |
| 2,583,291 | 1/1952 | Beem | 251/225 |
| 3,107,082 | 10/1963 | Reynolds | 137/269 |
| 3,789,862 | 2/1974 | Keller, III | 137/15 |
| 3,904,169 | 9/1975 | Cohn et al. | 251/223 |
| 3,911,946 | 10/1975 | Humpert et al. | 137/606 |
| 4,134,420 | 1/1979 | Okonowitz | 251/225 |
| 4,344,452 | 8/1982 | Sato | 137/238 |

Primary Examiner—George L. Walton
Attorney, Agent, or Firm—Natter & Natter

[57] ABSTRACT

A faucet repair system is provided for the removal of loose or broken faucet components, debris or other material which may be lodged in a faucet body or water feed line. A hollow coupling having threads identical to the bonnet or stem nut of the defective faucet includes a collar over which an outlet tube is connected. The bonnet or stem nut and stem are removed and the coupling is screwed into the faucet body. A bend in the tube directs water flow into a lavatory or sink basin when the water feed line shutoff valve is then opened. The water flow carries with it the loose material. A modified outlet tube includes a trap which retains the dislodged article and is suitable for elongate objects.

14 Claims, 7 Drawing Figures

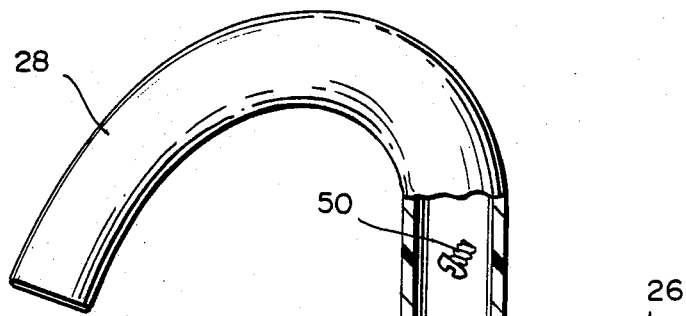
FIG. 3
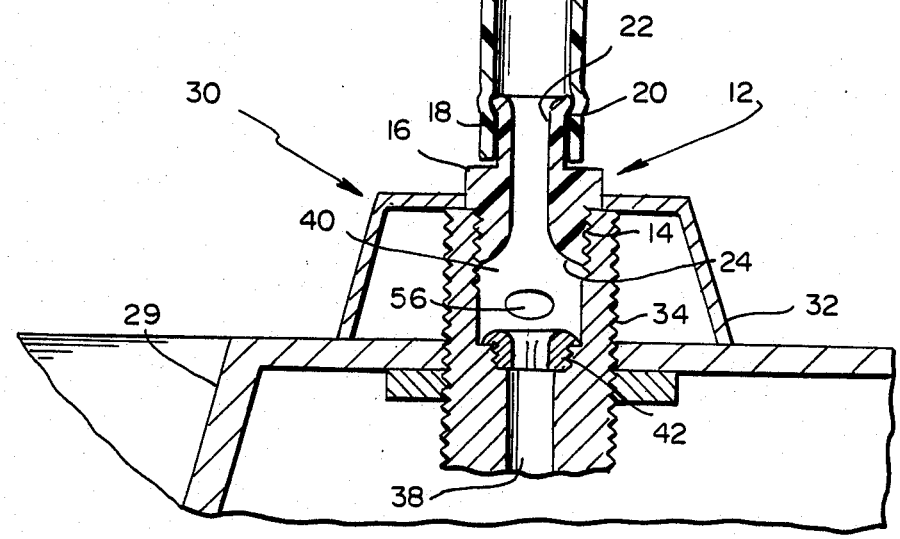
FIG. 4
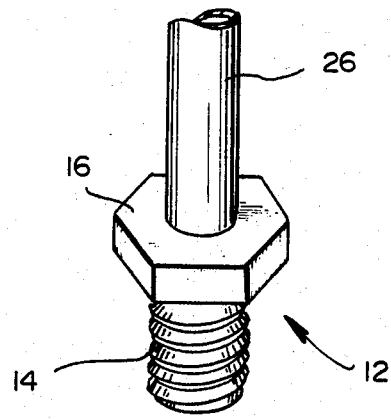
FIG. 5
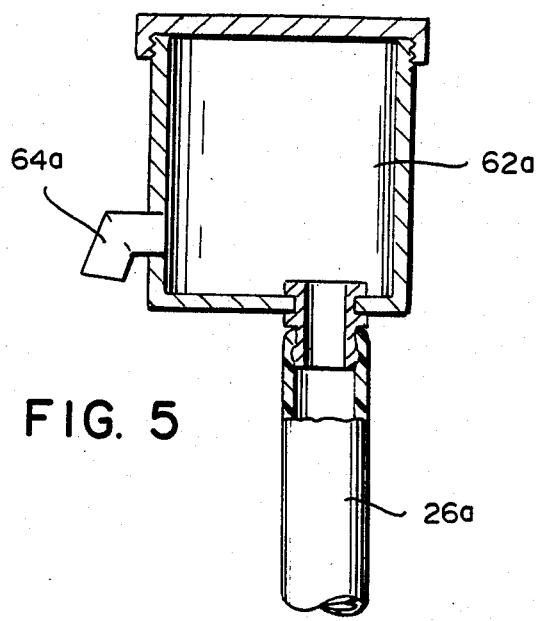

FAUCET REPAIR SYSTEM

TECHNICAL FIELD

This invention relates generally to faucet repair devices and more specifically to a tool and system for efficacious removal of material which may be lodged in a faucet or a water feed line.

BACKGROUND ART

The majority of water faucets employed a threaded stem which carried a washer at one end. The stem was threaded for vertical translational movement relative to a faucet body. The stem either directly engaged threads in the faucet body or engaged mating threads in a stem nut which was, in turn, threadingly mounted to the faucet body. To control water flow, the stem was rotated by a handle at its upper end and moved the washer relative to a faucet seat which provided a closable opening to the water feed line.

After continued usage, the faucet components were subjected to wear through a number of factors including corrosion, torsional and compressive stresses and water flow abrasion. As a result, faucet components were susceptible to breakage, fracture and dislodgement within the faucet body or water feed line. A common occurrence was the dislodgement of the water retaining screw. This was due to a combination of factors including rotation of the stem while the screw was frictionally restrained by the washer in contact with the seat.

Pieces of washer material and fragments of washer screws, e.g. broken screw heads, were often dislodged. The dislodged materials were turbulently carried by the water flow and caused annoying vibration within the faucet body and/or water feed line and accelerated wear on further faucet elements.

When repairs were attempted, the water feed line valve was first shut off and the faucet opened. If the dislodged object was accessible in the faucet body, retrieval was possible. Often, attempts at retrieving the object were unsuccessful and the object fell into the water feed line. In a majority of instances, the objects had fallen into the water feed line prior to removal attempts. Once the object fell into the water feed line, it became unretrievable with ordinary tools.

To compound the problem, unsuccessful attempts at retrieval of an object from the water feed line were made with unsuitable implements such as hairpins, wire hangers and paper clips, with the result that the repair implements themselves were dropped into the water feed line. When the qualified repair personnel were finally retained, corrective repair required the dismantling of the water feed line and, in some occasions, replacement of the feed line.

While it occurred to the inventor that the water supply valve could be opened to flush out the object from the line, this practice was accompanied by significant and major disadvantages. The resulting geyser flow would be uncontrollable and result in showering the environs with water. If a hot water line was being purged, the water flow itself was accompanied by potential burn risk. Further, uncontrolled water showers could cause water damage to the ceiling, floors, cabinets and walls, much to the housewife's dismay.

In addition, if such attempt was made, one was still not certain if the object was actually removed since it was difficult, if not impossible, to locate a small object which could have been thrown anywhere by the water geyser. It would be necessary to reassemble the faucet after replacing the washer and washer screw and any other broken components, reopen the water feed valve and see if the annoying vibration remained. If it did, the faucet had to be dismantled again and the room sprayed in a further attempt to flush the object loose

DISCLOSURE OF THE INVENTION

In compendium, the present invention comprises a system for quickly and efficiently purging a faucet and water supply line of dislodged material and debris without causing a water spray in the area of the faucet and without requiring dismantling of the water feed line. A hollow coupling is threaded in a manner identical to a faucet bonnet or stem nut for the particular faucet in need of repair. The bonnet, stem nut and stem are removed after first shutting off the water supply. The coupling is then tightened in the faucet and an outlet tube is connected to the coupling. The tube directs the water flow into the basin when the water supply valve is opened. Thus, a purge flow is provided without spillage or splattering of water about the room. The dislodged object is collected in the basin for a positive identification and a determination of its removal. In a further embodiment, an outlet tube is connected to a trap which collects the dislodged object and which is suitable for the retrieval of elongate objects which may have been dropped into the water feed line.

From the foregoing summary, it will be appreciated that it is an object of the present invention to provide a faucet repair system of the general character described which is adapted to alleviate the problems heretofore encountered.

A further object of the present invention is to provide a faucet repair system of the general character described which permits a safe, efficient and tidy removal of objects lodged in a water feed line and/or faucet.

A further object of the present invention is to provide a faucet repair system of the general character described which is adapted to direct a flow of purge fluid into a suitable receptacle.

Another object of the present invention is to provide a faucet repair system of the general character described which facilitates the retrieval and identification of an object lodged in a faucet or water feed line.

A further object of the present invention is to provide a faucet repair system of the general character described which includes a coupling adapted to engage a faucet and provide a controlled flow path for a purge flow.

An additional object of the present invention is to provide a faucet repair system of the general character described which is suitable for the removal of objects of various sizes which may have been inadvertently lodged in a water feed line without the dismantling of the water feed line itself.

Another object of the present invention is to provide a faucet repair system of the general character described which provides time and labor saving efficiencies heretofore unattainable.

Other objects, features and advantages of the present invention in part will be obvious and in part will be pointed out hereinafter.

With these features, objects and aspects in mind, the invention finds embodiment in the various combinations, elements and arrangements of parts and series of steps by which the invention is achieved, all with reference to the accompanying drawings and the scope of which is more particularly pointed out and indicated in the appended claims.

BRIEF DESCRIPTION OF THE DRAWINGS

With reference to the accompanying drawings wherein some of the various possible exemplary embodiments of the invention are shown:

FIG. 3 is an enlarged fragmentary sectional view through the faucet illustrated in FIG. 1 and showing the faucet repair system of the present invention in operation;

FIG. 4 is an enlarged fragmentary perspective illustration of the faucet repair system;

FIG. 5 is a sectional view through a modified outlet tube of the faucet repair system wherein a trap is provided;

DESCRIPTION OF THE PREFERRED EMBODIMENTS

Figure 1:
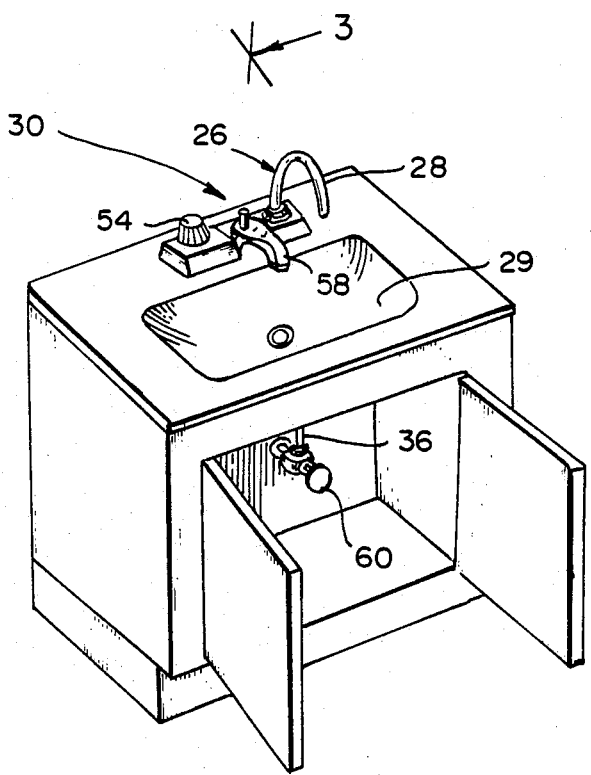
FIG. 1 is a perspective illustration of a lavatory and showing a faucet repair system constructed in accordance with the present invention and including a coupling and an outlet tube.

Referring now in detail to the drawings, the reference numeral 10 denotes generally a faucet repair system constructed in accordance with and embodying the present invention. The repair system 10 includes a one-piece hollow coupling 12 illustrated in FIGS. 3 and 4. The coupling 12 includes a downwardly projecting externally threaded shank 14 which extends from an enlarged shoulder 16. The shoulder 16 may be shaped in the manner of a six sided nut with, for example, six flats for tightening with the use of a wrench or socket. Projecting upwardly from the shoulder 16 is a collar 18 which may include a smooth enlarged bead or ring 20 at its mouth. The coupling 12 is formed of one piece, preferably molded construction of a suitable thermoplastic such as ABS, polyethylene, polypropylene, polycarbonates and the like. It may, of course, be machined or cast of a suitable metal such as copper or brass.

From an observation of FIG. 3, it will be seen that the coupling 12 includes an axial longitudinal bore 22 extending through the collar 18, the shoulder 16 and the shank 14. Adjacent the tip of the shank 14, the bore is flared outwardly at a zone 24 to provide a smooth transition surface for flow of water as well as objects being flushed from the faucet or water feed line.

The repair system also includes a hollow outlet tube 26 formed of rubber or plastic. A lower end of the tube 26 is secured over the collar 18 as illustrated in FIG. 3. The tube 26 includes a bent portion 28 adjacent its upper end. The bent portion 28 is oriented so as to direct and control the flow of water into a lavatory or sink basin 29.

Figure 2:
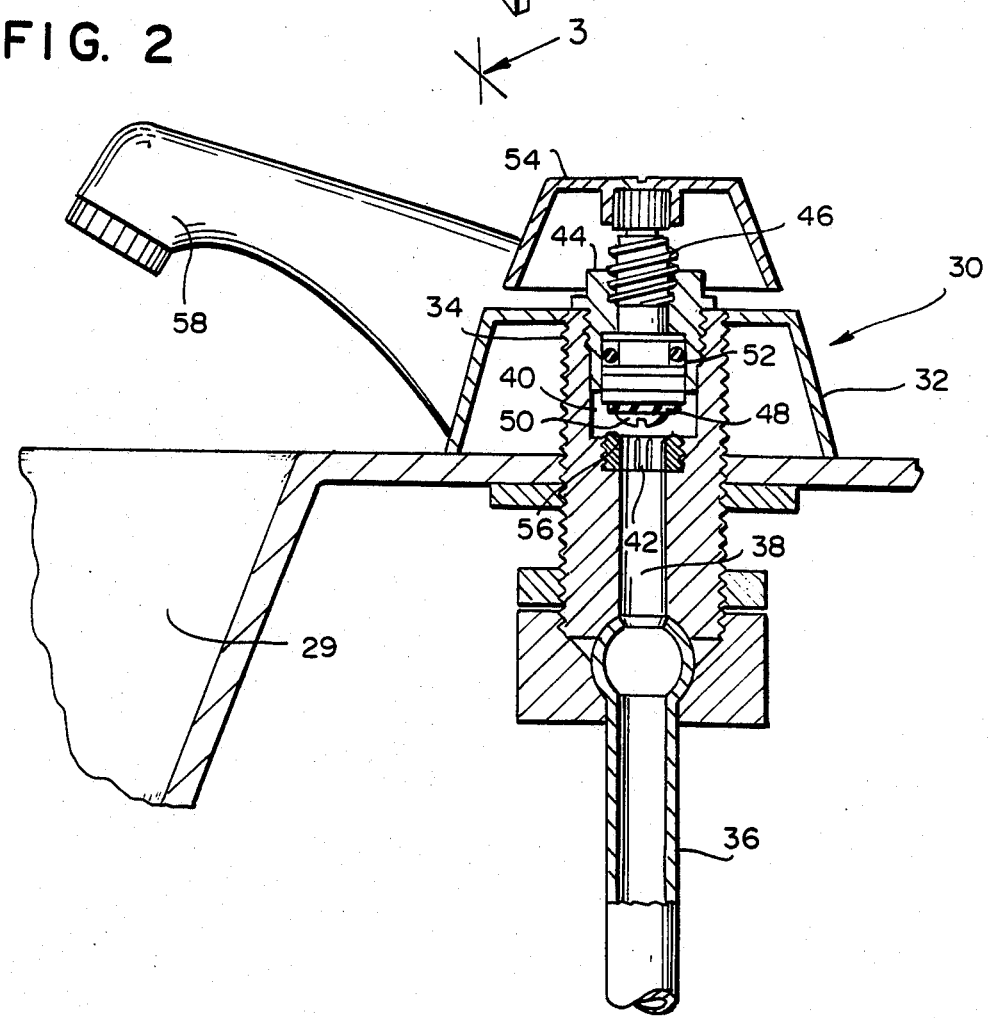
FIG. 2 is an enlarged transverse sectional view through a lavatory faucet and water feed line in good working order and illustrating various faucet components.

For a more complete understanding of the nature and operation of the faucet repair system 10 of the present invention, attention is now directed to FIG. 2 wherein a transverse cross-sectional view is taken through a lavatory faucet 30 in good working condition. The faucet 30 includes a base 32 which carries a pair of externally threaded generally cylindrical valve bodies 34. To the lower end of each valve body a nut secures an end of a water feed line 36.

The valve body 34 includes an axial bore 38 extending upwardly from the water feed line 36 and terminating at an enlarged cylindrical chamber 40. A valve seat 42 is threadingly secured in the upper end of the bore 38. Adjacent the upper end of the chamber 40, the chamber walls are threaded and receive a stem nut 44. The stem nut includes an internally threaded section within which mating threads of a valve stem 46 are engaged. A washer 48 is fastened to the bottom of the valve stem by a screw 50.

To prevent water leakage around the valve stem an O ring seal 52 is provided between the body of the stem and an internal bore of the stem nut 44. When a handle 54 is rotated, the valve stem 46 rotates with respect to the stem nut 44 and the stem will either move upwardly or downwardly depending upon the direction of rotation. Movement of the valve stem either raises the washer off the valve seat or forces the washer against the valve seat thus controlling water flow. With the washer lifted above the seat, water from the feed line 36 passes into the chamber 40 and through a passageway 56 into a spout 58.

When a faucet is in need of repair a water feed line shutoff valve 60 is closed, the handle 54, stem nut 44 and valve stem 46 are then removed to access the valve body as well as the washer.

If material has become dislodged from the valve stem as, for example, the screw 50 or a portion of the screw or a piece of washer material or the like, such material may possibly be removed if it did not pass beyond the seat 42. If the material cannot be lifted from the valve body, the faucet repair system 10 is employed.

The coupling 12 is inserted into the valve body chamber 40 and the external threads on the shank 14 are configured to mate with the internal threads at the upper end of the chamber 40. It has been found that one of the most common thread sizes employed in stem nut valve body engagements is ¾ inch diameter, 20 threads per inch.

Because pursuant to the present invention a relatively large flow passage is available with little back pressure, it is not necessary to tighten the coupling through the use of a wrench, and hand tightening has been found to be sufficient to preclude leakage. If desired, a wrench may be employed to tighten the coupling 12. Additionally, since the valve body is preferably formed of a thermoplastic which is yieldable, an effective water seal may be achieved without the usage of a tightening tool.

After the coupling shank 14 has been screwed into the chamber 40, the outlet tube 26 is slipped over the collar 18. As previously mentioned, the bead 20 provides a seal against water leakage. The outlet tube 26 includes a bent portion 28 adjacent its end, and the tube is oriented so that water flow will exit directly into the basin 29.

As illustrated in FIG. 3, when the shutoff valve 60 is opened, water flows upwardly through the bore 38 of the faucet body into the chamber 40, through the coupling bore 22 and then out the tube 26. The flow of water carries with it any materials lodged in the faucet body and/or water feed line. As previously mentioned, the tapered zone 24 of the collar bore 22 provides a smooth transition between the chamber 40 and the collar and thus facilitates the flushing of the objects being removed together with the water flow. The material or objects carried with the flow will not have a tendency to enter the passageway 56 since the flow path of least resistance is through the outlet tube 26.

The objects removed from the faucet body and water feed line will be retained in the lavatory or sink basin 29 so that their presence will be readily detected.

In FIG. 5 an alternate embodiment of the repair system is illustrated wherein the outlet tube 26a is not bent adjacent its end but feeds into a collar of a trap 62a. The trap 62a may be cylindrical in shape and includes a bottom and side wall, as well as a lid. A down spout 64a is provided in the side wall to direct water flow into the basin. The trap lid is removable to facilitate identification of any objects removed from the water line and thus permit appropriate replacement of broken parts. In addition, the trap is of a height sufficient to permit the capture of elongate objects or implements which may have been lodged in the water feed line and which would not be able to pass through a bent portion of the outlet tube.

Figure 6:
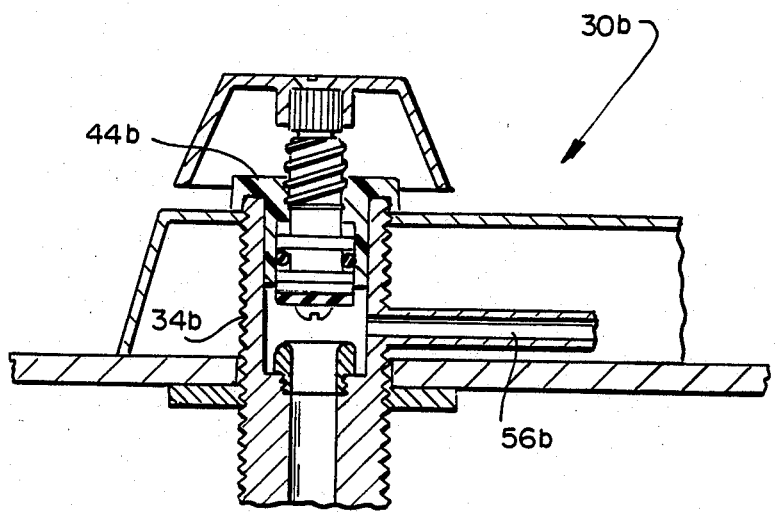
FIG. 6 is a fragmentary longitudinal sectional view through a different faucet which requires an internally threaded coupling.

In FIG. 6, a longitudinal sectional view through a further type of faucet is illustrated. In this embodiment, a deck type faucet 30b includes a valve body 34b and a stem nut 44b which includes internal threads for mating with external threads on the valve body 34b. A coupling pursuant to the present invention requires internal threads for engagement on the external threads of the valve body 34b.

Figure 7:
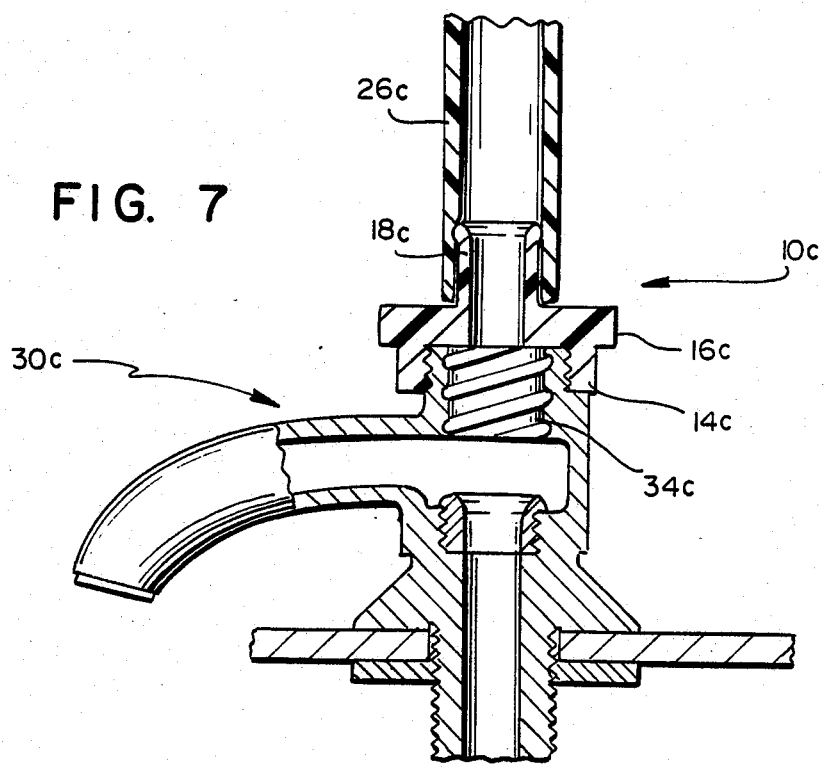
FIG. 7 is a fragmentary longitudinal sectional view through a further type of faucet wherein a stem nut is not employed and showing a repair system having an internally threaded coupling suitable for engagement with such faucet as well as with the faucet illustrated in FIG. 6.

A further faucet 30c is illustrated in FIG. 7. In this faucet, a stem nut is not employed, and a valve stem is directly threaded into internal threads of a valve body 34c. The stem (not shown) is secured to the valve body with a bonnet. Pursuant to the invention, a repair system 10c suitable for implementation in conjunction with the valve 30c, as well as the valve 30b, includes an internally threaded skirt 14c, a shoulder 16c and a collar 18c.

As previously mentioned, it has been found that the majority of faucets are adapted for ¾ - 20 stem nuts. It should be appreciated that a supply of couplings with various thread sizes may be provided in a kit. The thread sizes will mate with the various valve body threads, bonnets or cap nuts as the case may be.

It should be appreciated that many modifications of the faucet repair system are evident without departing from the spirit of the invention. For example, the repair system is equally suitable for cartridge or washerless type faucets by providing a coupling which mates with the threads of a cap or other device which secures the operative valve components to a valve body or housing and thus provides an unobstructed flow path coupled with an outlet tube for controlled discharge.

Thus, it will be seen that there is provided a faucet repair system which achieves the various objects of the invention and which is well suited to meet the conditions of practical usage.

As various modifications might be made in the invention as above set forth, it is to be understood that all matter herein described or shown in the accompanying drawings is to be interpreted as illustrative and not in a limiting sense.

Having thus described the invention, there is claimed as new and desired to be secured by Letters Patent:

1. A faucet repair system suitable for removal of material lodged in a faucet or a water feed line connected to the faucet, the faucet having a valve body, an operative component seated within the body, a retaining element means for retaining the operative component within the body, means for securing the retaining means to the fauce body, the securing means being engageable with the faucet body and a handle means for moving the operative component to adjustably control water flow through the faucet body during normal operation, the faucet repair system comprising coupling means forming an unobstructed flow path through the faucet body after the operative component and the retaining means have been removed together from the faucet body, and conduit means for directing water flow from the coupling means to a receptacle, the coupling means including connecting means engageable with the faucet body in a manner identical to that of the means securing the retaining means to the faucet body, whereby a controlled flow of water through the faucet body will remove the material lodged in the faucet or feed line and deposit such material in the receptacle.

2. A faucet repair system constructed in accordance with claim 1 wherein the receptacle comprises a basin.

3. A faucet repair system constructed in accordance with claim 1 wherein the means for directing the water flow to a receptacle comprises a tube.

4. A faucet repair system constructed in accordance with claim 3 wherein the tube includes a bent portion for directing the water flow into a basin.

5. A faucet repair system constructed in accordance with claim 1 wherein the receptacle comprises a trap for the collection and identification of the material removed, the water flow directing means being operatively connected to the trap.

6. A faucet repair system constructed in accordance with claim 1 wherein the operative component comprises a rotatable valve stem, the retaining means comprises a stem nut, and the securing means comprises mating threads on the stem nut and faucet, the connecting means including means forming threads on the coupling means mating with the threads on the faucet.

7. A faucet repair system constructed in accordance with claim 1 wherein the coupling means and the connecting means are formed of one piece construction.

8. A faucet repair system constructed in accordance with claim 1 wherein the coupling means includes a body, the means forming the unobstructed flow path including means forming an axial bore through the body, the body including a collar at the upper end thereof, the means for directing the water flow including a tube engaging the collar.

9. A faucet repair system constructed in accordance with claim 8 wherein the bore is outwardly flared at its lower end, whereby the smooth passage of material through the faucet repair system is facilitated.

10. A faucet repair system constructed in accordance with claim 1 wherein the operative component comprises a valve stem, the retaining means comprises a bonnet, and the securing means comprises mating threads on the faucet and the bonnet, the connecting means including means forming threads on the coupling means mating with the threads on the faucet.

11. A kit for the removal of lodged material from a variety of different types of faucets, the kit comprising a plurality of coupling means as constructed in accordance with claim 1, each coupling means having a differently configured connecting means, the kit further including at least one means for directing water flow from a coupling means to a receptacle.

12. A method of removing materials lodged in a faucet or water feed line, the faucet having a body, an operative component seated within the body, a retaining element means for retaining the operative component within the body, means for securing the retaining means to the faucet body and a handle means for moving the operative component to adjustably control water flow through the faucet body during normal operation by the method employing a coupling means having an unobstructed flow path and connecting means engageable with the faucet body, the method comprising the steps of
(a) closing a shutoff valve to terminate water supply through the water feed line,
(b) disassembling the faucet by
  (i) removing the handle means
  (ii) releasing the securing means,
  (iii) removing the retaining means and removing the operative component,
(c) attaching the coupling means to the faucet body by engaging the connecting means with the faucet body in a manner identical to that of the means securing the retaining means to the faucet body,
(d) providing a receptacle for the collection of water and the material to be dislodged,
(e) opening the shutoff valve to commence water flow through the water feed line, and
(f) directing the flow of water and the removed material from the coupling means to the receptacle.

13. A method of removing materials lodged in a faucet or water feed line in accordance with claim 12 wherein the flow of water and removed material is directed with a tube.

14. A method of removing materials lodged in a faucet or water feed line in accordance with claim 12 wherein the flow of water and removed materials is directed by operatively connecting the tube to the coupling means after the coupling means has been attached to the faucet and orienting an end of the tube to discharge the water flow into the receptacle.

* * * * *